United States Patent
Liu et al.

(10) Patent No.: US 8,837,938 B2
(45) Date of Patent: Sep. 16, 2014

(54) METHOD AND DEVICE FOR MONITORING SUBMARINE CABLE SYSTEM

(75) Inventors: Lei Liu, Shenzhen (CN); Guangyong Zhang, Shenzhen (CN); Zhiyong Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 727 days.

(21) Appl. No.: 13/089,912

(22) Filed: Apr. 19, 2011

(65) Prior Publication Data

US 2011/0194853 A1 Aug. 11, 2011

Related U.S. Application Data

(63) Continuation of application No. PCT/CN2009/074455, filed on Oct. 14, 2009.

(30) Foreign Application Priority Data

Oct. 21, 2008 (CN) .......................... 2008 1 0224575

(51) Int. Cl.
*H04B 10/08* (2006.01)
*G01M 11/00* (2006.01)
*H04B 10/079* (2013.01)

(52) U.S. Cl.
CPC ......... *H04B 10/079* (2013.01); *G01M 11/3127* (2013.01)
USPC ................................ 398/33; 398/13; 398/151

(58) Field of Classification Search
CPC .. H04B 10/071; H04B 10/077; H04B 10/079; H04B 10/07957; H04B 10/142
USPC ............................................... 398/13, 33, 151
See application file for complete search history.

(56) References Cited

U.S. PATENT DOCUMENTS

| | | |
|---|---|---|
| 5,686,986 A | 11/1997 | Li et al. |
| 2002/0012142 A1 | 1/2002 | Gautheron et al. |
| 2003/0007142 A1 * | 1/2003 | Hotate et al. .................. 356/73.1 |

(Continued)

FOREIGN PATENT DOCUMENTS

| | | |
|---|---|---|
| CN | 1052369 A | 6/1991 |
| CN | 101208884 A | 6/2008 |

(Continued)

OTHER PUBLICATIONS

Office Action issued in corresponding Chinese Patent Application No. 200810224575.6, mailed Nov. 5, 2012.

(Continued)

*Primary Examiner* — Dzung Tran
(74) *Attorney, Agent, or Firm* — Brinks Gilson & Lione

(57) ABSTRACT

A method and a device for monitoring a cable system in the field of communications are provided. An optical signal emitted by an optical source to a transmission link of the cable system is divided into two paths of optical signals, in which one path of optical signals serve as local coherent light, and the other path of optical signals are transformed by multipath frequency shift to multiple paths of detection optical signals of different frequencies. A monitoring result is obtained by performing coherent detection, with the local coherent light, on the returned optical signals of the multiple paths of detection optical signals of different frequencies. The device includes an optical source, a multipath frequency shift module, and a coherency module.

8 Claims, 3 Drawing Sheets

(56) References Cited

U.S. PATENT DOCUMENTS

| | | | |
|---|---|---|---|
| 2005/0196174 A1* | 9/2005 | Evangelides et al. | 398/151 |
| 2008/0050120 A1 | 2/2008 | Neubelt | |
| 2008/0088846 A1* | 4/2008 | Hayward et al. | 356/446 |
| 2009/0008536 A1* | 1/2009 | Hartog et al. | 250/227.14 |

FOREIGN PATENT DOCUMENTS

| | | |
|---|---|---|
| DE | 19638390 A1 | 3/1997 |
| EP | 0178814 A2 | 4/1986 |
| EP | 1189367 A1 | 3/2002 |
| EP | 1219945 A2 | 7/2002 |
| JP | 5126674 A | 5/1993 |
| JP | 09-236513 | 9/1997 |
| JP | 11060631 A | 3/1999 |
| JP | 2005223803 A | 8/2005 |
| JP | 2007093405 A | 4/2007 |
| JP | 2008124573 A | 5/2008 |

OTHER PUBLICATIONS

Office Action issued in corresponding Japanese Patent Application No. 2011-532483, mailed May 14, 2013, 4 pages.

Chinese Patent No. 101729141, issued on Jun. 5, 2013, granted in corresponding Chinese Patent Application No. 200810224575.6, 1 page.

Extended European Search Report issued in corresponding European Patent Application No. 09821574.2, mailed Apr. 17, 2012.

Office Action issued in corresponding Japanese Patent Application No. 2011-532483, mailed Aug. 7, 2012.

Office Action issued in corresponding Canadian Patent Application No. 2,740,634, mailed Apr. 3, 2013.

Written Opinion of the International Searching Authority issued in corresponding PCT Patent Application No. PCT/CN2009/074455, mailed Jan. 21, 2010.

Office Action issued in corresponding Chinese Patent Application No. 200810224575.6, mailed Feb. 13, 2012.

Author Unknown, "On2Line Supervision for Undersea Optical Fiber System and Technique of Coherent Optical Time2Domain Reflectometer" Jiangsu Communication Technology, vol. 17 No. 6, Dec. 2001.

International Search Report issued in corresponding PCT Patent Application No. PCT/CN2009/074455, mailed Jan. 21, 2010.

Sumida, "Optical Time Domain Reflectometry Using an M-ary FSK Probe and Coherent Detection", Journal of Lightwave Technology, vol. 14, No. 11, Nov. 1996.

* cited by examiner

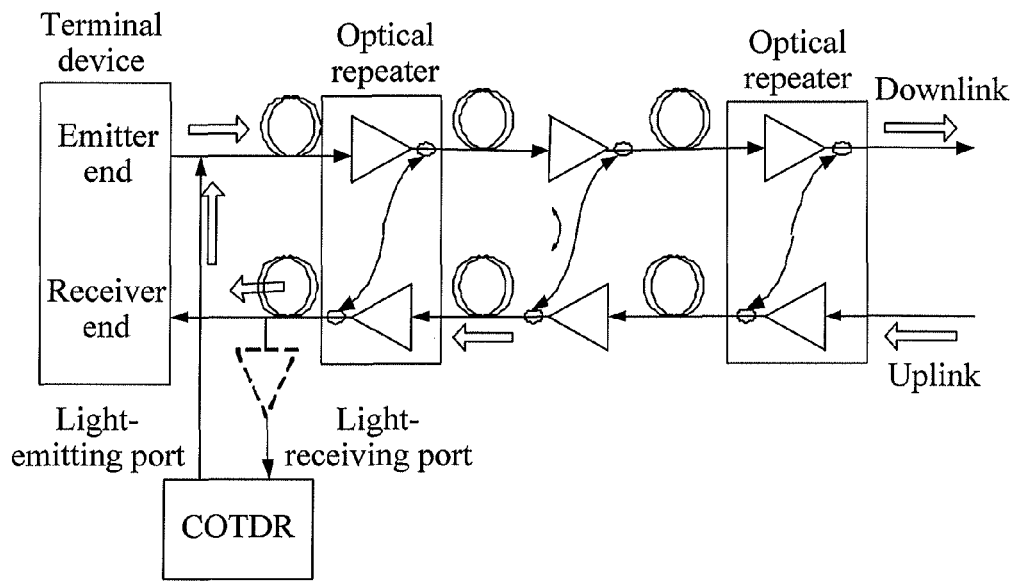

FIG. 1 (PRIOR ART)

Divide an optical signal emitted by an optical source into two paths of optical signals, in which one path of optical signal serve as a local coherent light signal, and the other path of optical signal is transformed by multipath frequency shift to multiple paths of detection optical signals of different frequencies ── 101

Obtain a monitoring result by performing coherent detection, with the local coherent light signal, on returned optical signals of the multiple paths of detection optical signals of different frequencies ── 102

FIG. 2

Frequency of filling light

Frequency of filling light

Frequencies of detection light

METHOD AND DEVICE FOR MONITORING SUBMARINE CABLE SYSTEM

CROSS-REFERENCE TO RELATED APPLICATIONS

This application is a continuation of International Application No. PCT/CN2009/074455, filed on Oct. 14, 2009, which claims priority to Chinese Patent Application No. 200810224575.6, filed on Oct. 21, 2008, both of which are hereby incorporated by reference in their entireties.

FIELD OF THE TECHNOLOGY

The present disclosure relates to the field of communications, and more particularly to a method and a device for monitoring a submarine cable system.

BACKGROUND

With the rapid development of information technologies, the submarine cable network covering all major seas around the world has become an important communication network that bears important international communication services. In order to guarantee smooth communication services, it makes great sense to monitor a submarine cable system. Due to unique characteristics of a submarine optical cable communication system, an online test, that is, direct online monitoring without interrupting the service, is needed sometimes. Therefore, different loop structures are employed for monitoring the submarine cable system, and special test loops are used to feed back monitoring signals.

Currently, the principle of monitoring a submarine cable system is mainly as follows. Optical pulses are emitted into an input optical fiber. Because the optical pulses are scattered by scattering particles, or reflected by fractured surfaces of the optical fiber due to Fresnel reflection, the Fresnel-reflected light and Rayleigh back-scattered light are sent into a receiver by a light beam splitter, and then are transformed into electrical signals and displayed on an oscilloscope together with the changing time. In this way, a monitoring result is obtained.

In the prior art, a Coherent Detection Optical Time Domain Reflectometer (COTDR) is used to monitor a submarine cable system with a modulation format of Amplitude Shift Keying (ASK) or Frequency Shift Keying (FSK), and then coherent reception is performed. For FSK, in essence, a signal of one frequency serves as detection light, and a signal of another frequency serves as filling light. By using the filling light, the surge phenomenon of an Erbium-doped Optical Fiber Amplifier (EDFA) is eliminated, and the performance of the COTDR is improved.

FIG. 1 is a schematic diagram of an application scenario of a COTDR in the prior art. The COTDR uses the Rayleigh scattering theory to monitor a submarine cable system. The Rayleigh scattering is a type of random scattering that occurs when an optical signal is transmitted along an optical fiber. The COTDR just monitors a part of the Rayleigh-scattered light that enters a light-receiving port of the COTDR. The location of a fault point is determined according to the power of the part of the Rayleigh-scattered light. For example, if the power drops abruptly at a time point on the curve of a monitoring result, it is deemed that a fault exists in the part of the submarine cable system corresponding to the time point, and the distance between the fault point and a land terminal can be calculated according to the time point, so that the location of the fault point is obtained. A special link needs to be designed for a signal feedback channel, and in this way, reflected light of the uplink channel and emitted optical pulse signals may enter the downlink channel through a light-emitting port of the COTDR and be reflected back.

In another solution for monitoring a submarine cable system, detection is performed by emitting light of multiple wavelengths to obtain a monitoring result. In the solution, a Distributed Bragg Reflector (DBR) laser is used to modulate frequencies in sequence with light of one wavelength emitted each time, and then the detection is performed.

After analyzing the prior art described above, the inventors find the following.

1) In a submarine cable system, when a COTDR is used to monitor the submarine cable system, in order to get a precise monitoring result, the monitoring result obtained each time needs to be averaged for many times, normally $2^{16}$ times or even $2^{24}$ times. Therefore, when a length of 5,000 km needs to be monitored, as each time of monitoring takes at least 0.05 s, the total time required for monitoring is about one hour ($2^{16}$ times) or more, and such long monitoring time may greatly affect the monitoring efficiency. Generally speaking, the monitoring time is long, and the performance of real-time monitoring is poor.

2) If a single tunable laser is applied to generate serial light of multiple wavelengths to perform detection, as coherent reception is based on the frequency of the filling light, only after the detection pulse is emitted and the frequency of the detection light changes to the frequency of the filling light can the waveform be detected. If more wavelengths are adopted, the monitoring blind zones are larger.

Because data is required to be aligned and accumulated at a receiver end, a large quantity of sampling data makes the system complex. In addition, the accumulating and buffering the large quantity of sampling data needs considerable data space and time.

The wavelength adjustment of the DBR laser takes time, which is not convenient for detection.

SUMMARY

In order to improve the performance of monitoring a submarine cable system, the embodiments of the present disclosure provide a method and a device for monitoring a submarine cable system.

A method for monitoring a submarine cable system includes the following steps: dividing an optical signal emitted by an optical source to a transmission link of a submarine cable system into two paths of optical signals, in which one path of optical signals serve as local coherent light, and the other path of optical signals are transformed by multipath frequency shift and serve as multiple paths of detection optical signals of different frequencies; and obtaining a monitoring result by performing coherent detection, with the local coherent light, on returned optical signals of the multiple paths of detection optical signals of different frequencies.

A device for monitoring a submarine cable system includes an optical source, a multipath frequency shift module, and a coherency module. The optical source is configured to emit an optical signal and divide the optical signal into two paths of optical signals, in which one path of optical signals serve as local coherent light, and the other path of optical signals serve as a detection optical signal. The multipath frequency shift module is configured to transform the detection optical signal emitted by the optical source into multiple paths of detection optical signals of different frequencies. The coherency module is configured to receive returned optical signals of the detection optical signals of different frequencies and perform coherent detection on the returned optical signals with the local coherent optical signal.

By sending detection signals in parallel, the method and the device provided by the present disclosure improve monitoring performance, greatly reduce detection time, eliminate monitoring blind zones, solve the problem of sample data alignment, save data space and time for accumulating and buffering a large quantity of data, and decrease optical power spectral densities and nonlinear effects of the detection optical signals.

BRIEF DESCRIPTION OF THE DRAWINGS

FIG. 1 is a schematic diagram of an application scenario of a COTDR in the prior art;

FIG. 2 is a flow chart of a method for monitoring a submarine cable system according to Embodiment 1 of the present disclosure;

DETAILED DESCRIPTION OF THE EMBODIMENTS

To make the objectives, solutions, and advantages of the present disclosure more comprehensible, the embodiments of the present disclosure are described in detail with reference to the accompanying drawings and embodiments in the following.

Embodiment 1

As shown in FIG. 2, an embodiment of the present disclosure provides a method for monitoring a submarine cable system. In the method, parallel light of multiple wavelengths is used for monitoring. A single optical source is used to serve as detection light and local coherent light. Optical signals of different frequencies can be generated from the detection light and are emitted together. A monitoring result is obtained by performing coherent detection, with the local coherent light, on the returned optical signals of the detection optical signals of different frequencies. The method includes the following steps.

Step 101: Divide an optical signal emitted by an optical source to a transmission link of a submarine cable system into two paths of optical signals, in which one path of optical signals directly serve as local coherent light signal, and the other path of optical signals are transformed by multipath frequency shift to multiple paths of detection optical signals of different frequencies.

The multipath frequency shift may be performed on the optical signal by using an acoustic-optic modulation device.

The optical signal is divided into multiple paths of optical signals of different frequencies that serve as detection optical signals, so that a detection optical signal contains multiple frequency components, which can effectively decrease the optical power spectral densities of the detection optical signals and nonlinear effects.

Step 102: Obtain a monitoring result by performing coherent detection, with the local coherent light, on returned optical signals of the multiple paths of detection optical signals of different frequencies.

The returned optical signals of the multiple paths of detection optical signals of different frequencies include scattered optical signals and reflected optical signals. A scattered optical signal is a random optical signal generated and returned when an optical signal is transmitted along the transmission link of the submarine cable system. A reflected optical signal is an optical signal returned from a fault point on the transmission link of the submarine cable system.

On a curve of the obtained monitoring result, if there is no breakpoint or abrupt point, the submarine cable system works properly; if there is any breakpoint or abrupt point, a fault exists in the submarine cable system.

Figure 3:
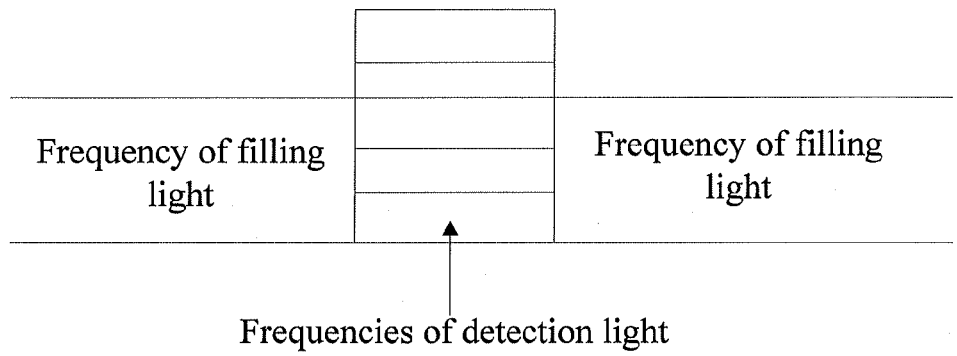
FIG. 3 is a schematic diagram of an output waveform according to Embodiment 1 of the present disclosure.

The optical source may also emit filling light after emitting the optical signal. The wavelength dispersion of the filling light may be ignored. As shown in FIG. 3, the power of the detection light may be greater than the power of the filling light, and therefore the monitoring range is extended.

By sending the filling light, the surge phenomenon of an EDFA is eliminated. Therefore, the performance of a COTDR is improved. In addition, the problem of instability in the operation of the EDFA caused by abrupt changes of the frequencies of the detection optical signals is solved.

The present disclosure has the following beneficial effects. By emitting parallel light of multiple wavelengths for detection, the monitoring blind zones are eliminated, the problem of sample data alignment is prevented, the data space and time for accumulating and buffering a large quantity of data are saved, and the monitoring time is greatly reduced without compromising the monitoring performance, for example, the monitoring time is reduced when the same distance is monitored; or higher monitoring performance is achieved within the same monitoring time, for example, a longer distance is monitored within the same monitoring time. Moreover, because the detection light contains multiple frequency components, the optical power spectral densities of this part and nonlinear effects are effectively decreased. In addition, because the filling light is added, the problem of instability in the operation of the EDFA caused by abrupt changes of the power of the detection optical signals is solved.

Embodiment 2

Figure 4:
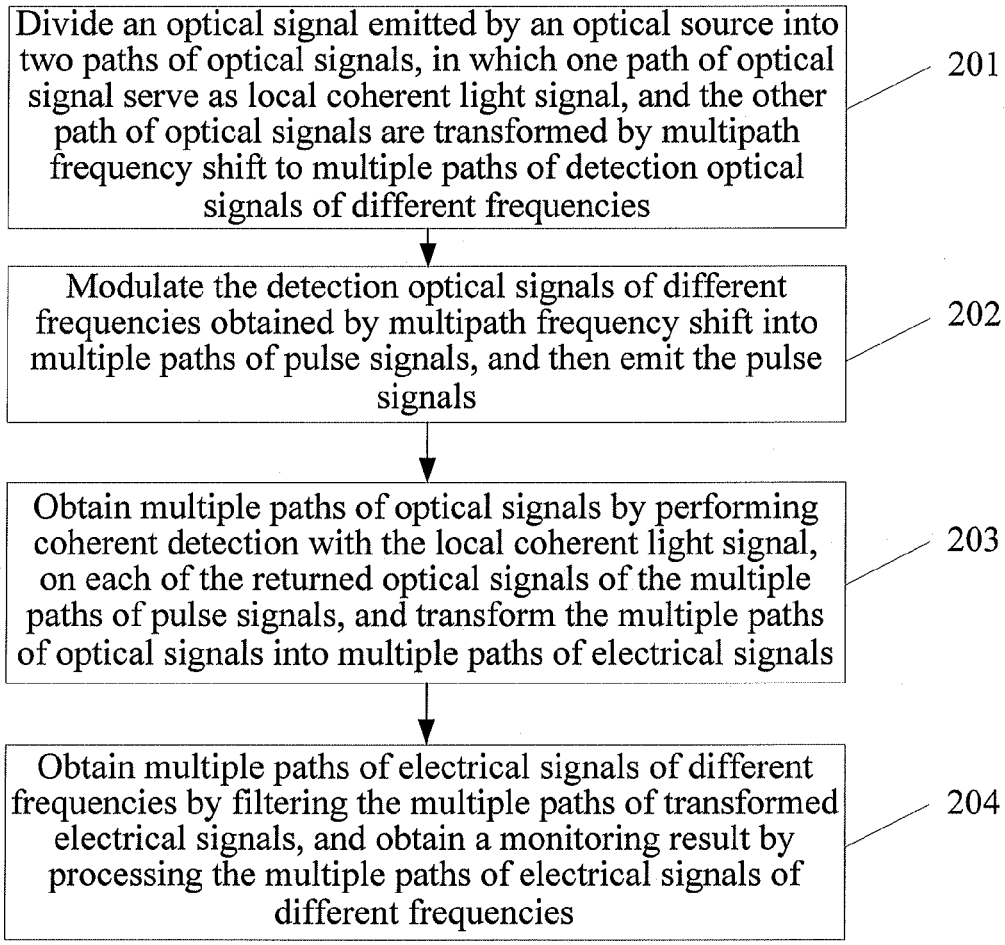
FIG. 4 is a flow chart of a method for monitoring a submarine cable system according to Embodiment 2 of the present disclosure.

As shown in FIG. 4, an embodiment of the present disclosure provides another method for monitoring a submarine cable system. In the method, parallel light of multiple wavelengths is used for monitoring. A single optical source is used to serve as detection light and local coherent light. Optical signals of different frequencies can be generated from the detection light and are emitted together. A monitoring result is obtained by performing coherent detection, with the local coherent light, on the returned optical signals of the detection optical signals of different frequencies. The method includes the following steps.

Step 201: Divide an optical signal emitted by an optical source to a transmission link of a submarine cable system into two paths of optical signals, in which one path of optical signals directly serve as local coherent light, and the other path of optical signals are transformed by multipath frequency shift and serve as multiple paths of detection optical signals of different frequencies.

Step 202: Modulate the detection optical signals of different frequencies obtained by multipath frequency shift into multiple paths of pulse signals, and then emit the pulse signals.

The detection optical signals may be modulated by using a pulse generator.

Step 203: Obtain multiple paths of optical signals by performing coherent detection, with the local coherent light, on each of returned optical signals of the multiple paths of pulse signals, and transform the multiple paths of optical signals into multiple paths of electrical signals.

The returned optical signals of the multiple paths of optical pulse signals include scattered optical signals and reflected optical signals. A scattered optical signal is a random optical signal generated and returned when an optical signal is transmitted along the transmission link of the submarine cable system. A reflected optical signal is an optical signal returned from a fault point on the transmission link of the submarine cable system.

The multiple paths of optical signals after coherent detection may be transformed into the multiple paths of electrical signals by using an opto-electronic detector.

Step 204: Obtain multiple paths of electrical signals of different frequencies by filtering the multiple paths of electrical signals obtained by performing transforming, and obtain a monitoring result by processing the multiple paths of electrical signals of different frequencies.

The multiple paths of electrical signals obtained by performing transforming may also be filtered by using a multipath filter. Devices with a filter center, for example, electric filters, can be used in the multipath filter to filter out signals of different frequencies.

The processing of the multiple paths of electrical signals of different frequencies is the same as that in the prior art, and the details are not described herein again.

On a curve of the obtained monitoring result, if there is no breakpoint or abrupt point, the submarine cable system works properly; if there is any breakpoint or abrupt point, a fault exists in the submarine cable system.

The optical source may also emit filling light after emitting the optical signal. The wavelength dispersion of the filling light may be ignored. As shown in FIG. 3 of Embodiment 1, the power of the detection light may be greater than the power of the filling light, and therefore the monitoring range is extended.

By sending the filling light, the surge phenomenon of an EDFA is eliminated. Therefore, the performance of a COTDR is improved. In addition, the problem of instability in the operation of the EDFA caused by abrupt changes of the frequencies of the detection optical signals is solved.

The present disclosure has the following beneficial effects. By emitting parallel light of multiple wavelengths for detection, the monitoring blind zones are eliminated, the problem of sample data alignment is prevented, the data space and time for accumulating and buffering a large quantity of data are saved, and the monitoring time is greatly reduced without compromising the monitoring performance, for example, the monitoring time is reduced when the same distance is monitored; or higher monitoring performance is achieved within the same monitoring time, for example, a longer distance is monitored within the same monitoring time. Moreover, because the detection light contains multiple frequency components, the optical power spectral densities of this part and nonlinear effects are effectively decreased. In addition, because the filling light is added, the problem of instability in the operation of the EDFA caused by abrupt changes of the power of the detection light is solved.

Embodiment 3

Figure 5:
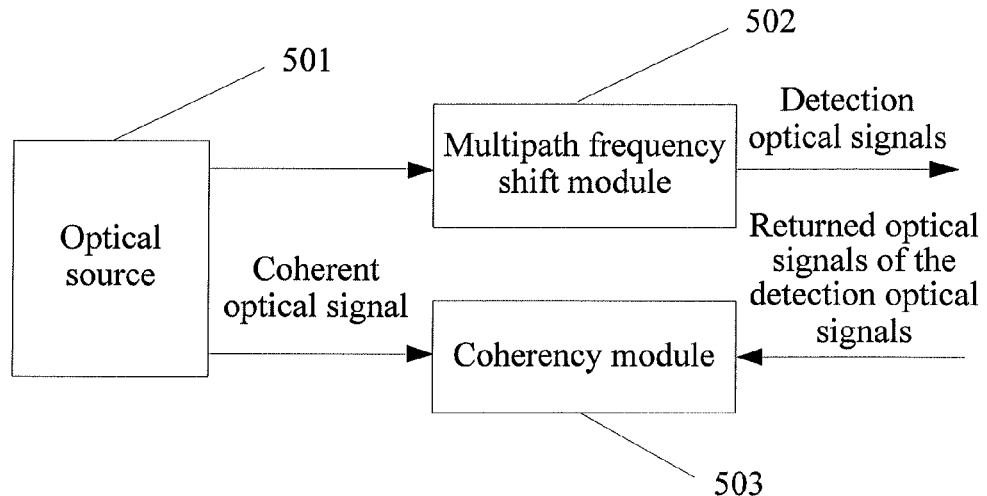
FIG. 5 is a schematic diagram of the structure of a device for monitoring a submarine cable system according to Embodiment 3 of the present disclosure.

As shown in FIG. 5, an embodiment of the present disclosure provides a device for monitoring a submarine cable system. The device includes an optical source 501, a multipath frequency shift module 502, and a coherency module 503.

The optical source 501 is configured to emit an optical signal, and divide the optical signal emitted to a transmission link of a submarine cable system into two paths of optical signals, in which one path of optical signals serves as local coherent light signal, and the other path of optical signals is transformed by the multipath frequency shift module 502 to multiple detection optical signals.

The multipath frequency shift 502 is configured to divide the optical signal emitted by the optical source 501 into multiple paths of optical signals of different frequencies.

The multipath frequency shift may be performed on the optical signal by using an acoustic-optic modulation device.

The optical signal is divided into multiple paths of optical signals of different frequencies that serve as detection optical signals, so that a detection optical signal contains multiple frequency components, which can effectively decrease the optical power spectral densities of this part and nonlinear effects.

The coherency module 503 is configured to perform coherent detection on the returned optical signals of the detection optical signals passing through the multipath frequency shift module 502 with the local coherent optical signal emitted by the optical source 501, and obtain a monitoring result.

The returned optical signals of the multiple paths of detection optical signals of different frequencies include scattered optical signals and reflected optical signals. A scattered optical signal is a random optical signal generated and returned when an optical signal is transmitted along the transmission link of the submarine cable system. A reflected optical signal is an optical signal returned from a fault point on the transmission link of the submarine cable system.

On a curve of the obtained monitoring result, if there is no breakpoint or abrupt point, the submarine cable system works properly; if there is any breakpoint or abrupt point, a fault exists in the submarine cable system.

The optical source 501 may also emit filling light after emitting the optical signal. The wavelength dispersion of the filling light may be ignored. As shown in FIG. 3 of Embodiment 1, the power of the detection light may be greater than the power of the filling light, and therefore the monitoring range is extended.

By sending the filling light, the surge phenomenon of an EDFA is eliminated. Therefore, the performance of a COTDR is improved. In addition, the problem of instability in the operation of the EDFA caused by abrupt changes of the frequencies of the detection optical signals is solved.

The present disclosure has the following beneficial effects. By emitting parallel light of multiple wavelengths for detection, the monitoring blind zones are eliminated, the problem of sample data alignment is prevented, the data space and time for accumulating and buffering a large quantity of data are saved, and the monitoring time is greatly reduced without compromising the monitoring performance, for example, the monitoring time is reduced when the same distance is monitored; or higher monitoring performance is achieved within the same monitoring time, for example, a longer distance is monitored within the same monitoring time. Moreover, because the detection light contains multiple frequency components, the optical power spectral densities of this part and nonlinear effects are effectively decreased. In addition, because the filling light is added, the problem of instability in the operation of the EDFA caused by abrupt changes of the power of the detection light is solved.

Embodiment 4

Figure 6:
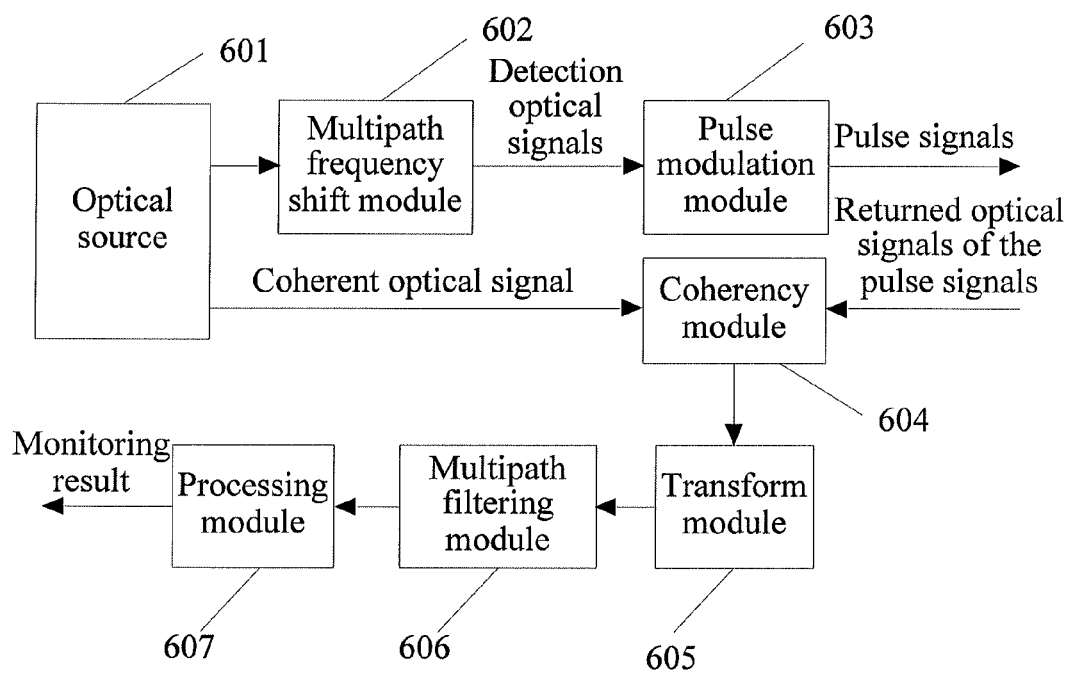
FIG. 6 is a schematic diagram of the structure of a device for monitoring a submarine cable system according to Embodiment 4 of the present disclosure.

As shown in FIG. 6, an embodiment of the present disclosure provides another device for monitoring a submarine cable system. The device includes an optical source 601, a multipath frequency shift module 602, a pulse modulation module 603, a coherency module 604, a transform module 605, a multipath filtering module 606, and a processing module 607.

The optical source 601 is configured to emit an optical signal, and divide the optical signal emitted to a transmission link of a submarine cable system into two paths of optical signals, in which one path of optical signals serves as local coherent light signal, and the other path of optical signals is transformed by the multipath frequency shift module 602 and serve as detection optical signals. The optical source 601 is also configured to emit filling light after emitting the optical signal. The wavelength dispersion of the filling light may be ignored. As shown in FIG. 3 of Embodiment 1, the power of the detection light may be greater than the power of the filling light, and therefore the monitoring range is extended.

By sending the filling light, the surge phenomenon of an EDFA is eliminated. Therefore, the performance of a COTDR is improved. In addition, the problem of instability in the operation of the EDFA caused by abrupt changes of the frequencies of the detection optical signals is solved.

The multipath frequency shift 602 is configured to divide the optical signal emitted by the optical source 601 into multiple paths of optical signals of different frequencies.

The multipath frequency shift may be performed on the optical signal by using an acoustic-optic modulation device.

The optical signal is divided into multiple paths of optical signals of different frequencies that serve as detection optical signals, so that a detection optical signal contains multiple frequency components, which can effectively decrease the optical power spectral densities of this part and nonlinear effects.

The pulse modulation module 603 is configured to modulate the multiple paths of optical signals of different frequencies obtained by the multipath frequency shift module 602 into multiple paths of pulse signals.

The detection optical signals may be modulated by using a pulse generator.

The coherency module 604 is configured to perform coherent detection, with the local coherent light, on each of the returned optical signals of the multiple paths of multiple paths of pulse signals obtained by the pulse modulation module 603, and obtain multiple paths of optical signals.

The returned optical signals of the multiple paths of optical pulse signals include scattered optical signals and reflected optical signals. A scattered optical signal is a random optical signal generated and returned when an optical signal is transmitted along the transmission link of the submarine cable system. A reflected optical signal is an optical signal returned from a fault point on the transmission link of the submarine cable system.

The multiple paths of optical signals after coherent detection may be transformed into multiple paths of electrical signals by using an opto-electronic detector.

The transform module 605 is configured to transform the multiple paths of optical signals obtained by the coherency module 604 into multiple paths of electrical signals.

The multiple paths of optical signals after coherent detection may be transformed into multiple paths of electrical signals by using an opto-electronic detector.

The multipath filtering module 606 is configured to obtain multiple paths of electrical signals of different frequencies by filtering the multiple paths of electrical signals obtained by the transform module 605.

The multiple paths of electrical signals obtained by performing transforming may also be filtered by using a multipath filter. Devices with a filter center, for example, electric filters, can be used in the multipath filter to filter out signals of different frequencies.

The processing module 607 is configured to obtain a monitoring result by processing the multiple paths of electrical signals of different frequencies obtained by the multipath filtering module 606.

The processing of the multiple paths of electrical signals of different frequencies is the same as that in the prior art, and the details are not described herein again.

The obtained monitoring result is the result of monitoring a submarine cable system. On a curve of the obtained monitoring result, if there is no breakpoint or abrupt point, the submarine cable system works properly; if there is any breakpoint or abrupt point, a fault exists in the submarine cable system.

The present disclosure has the following beneficial effects. By emitting parallel light of multiple wavelengths for detection, the monitoring blind zones are eliminated, the problem of sample data alignment is prevented, the data space and time for accumulating and buffering a large quantity of data are saved, and the monitoring time is greatly reduced without compromising the monitoring performance, for example, the monitoring time is reduced when the same distance is monitored; or higher monitoring performance is achieved within the same monitoring time, for example, a longer distance is monitored within the same monitoring time. Moreover, because the detection light contains multiple frequency components, the optical power spectral densities of this part and nonlinear effects are effectively decreased. In addition, because the filling light is added, the problem of instability in the operation of the EDFA caused by abrupt changes of the power of the detection light is solved.

The embodiments of the present disclosure can be implemented by using software, and the corresponding software program may be stored in a readable storage medium, such as a hard disk, a buffer, or an optical disk of a computer.

The above descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for monitoring a cable system, comprising:
dividing an optical signal emitted by an optical source to a transmission link of the cable system into two paths of optical signals, wherein one path of optical signals serves as a local coherent light signal, and the other path of optical signals is transformed by multipath frequency shift and serve as parallel lights of multiple paths of detection optical signals of different frequencies; and
obtaining a monitoring result by performing coherent detection, with the local coherent light signal, on returned optical signals of the parallel lights of multiple paths of detection optical signals of different frequencies.

2. The method for monitoring the cable system according to claim 1, further comprising: emitting, by the optical source, filling light after emitting the optical signal.

3. The method for monitoring the cable system according to claim 1, wherein the obtaining the monitoring result by performing coherent detection, with the local coherent light signal, on the returned optical signals of the parallel lights of multiple paths of detection optical signals of different frequencies comprises:

modulating the parallel lights of multiple paths of detection optical signals of different frequencies into multiple paths of pulse signals; and obtaining multiple paths of optical signals by performing coherent detection, with the local coherent light signal, on returned optical signals of the multiple paths of pulse signals.

4. The method for monitoring the cable system according to claim 3, wherein after the obtaining the multiple paths of optical signals by performing coherent detection, with the local coherent light signal, on each of the returned optical signals of the multiple paths of pulse signals, the method further comprises:

transforming the multiple paths of optical signals into multiple paths of electrical signals; and obtaining multiple paths of electrical signals of different frequencies by filtering the multiple paths of electrical signals obtained by performing transforming, and obtaining a monitoring result by processing the multiple paths of electrical signals of different frequencies.

5. A device for monitoring a cable system, comprising:

an optical source, configured to emit an optical signal and divide the optical signal into two paths of optical signals, wherein one path of optical signals serve as a local coherent light signal, and the other path of optical signals serve as a detection optical signal;

a multipath frequency shift module, configured to transform the detection optical signal into parallel lights of multiple paths of detection optical signals of different frequencies; and a coherency module, configured to receive returned optical signals of the parallel lights of multiple paths of detection optical signals of different frequencies and perform coherent detection on the returned optical signals with the local coherent light signal.

6. The device for monitoring the cable system according to claim 5, wherein the optical source is also configured to emit filling light after emitting the optical signal.

7. The device for monitoring the cable system according to claim 5, further comprising:

a pulse modulation module, configured to modulate the parallel lights of multiple paths of optical signals of different frequencies obtained by the multipath frequency shift module into multiple paths of pulse signals, wherein accordingly, the coherency module is configured to perform coherent detection, with the local coherent light signal, on each of the returned optical signals of the multiple paths of pulse signals obtained by the pulse modulation module.

8. The device for monitoring the cable system according to claim 7, further comprising:

a transform module, configured to transform multiple paths of optical signals obtained by the coherency module into multiple paths of electrical signals;

a multipath filtering module, configured to obtain multiple paths of electrical signals of different frequencies by filtering the multiple paths of electrical signals obtained by the transform module; and a processing module, configured to obtain a monitoring result by processing the multiple paths of electrical signals of different frequencies obtained by the multipath filtering module.

* * * * *